E. YOSS.
TESTING DEVICE FOR ELECTRICAL IGNITION APPARATUS FOR EXPLOSIVE ENGINES.
APPLICATION FILED JULY 20, 1912.
1,095,486.
Patented May 5, 1914.
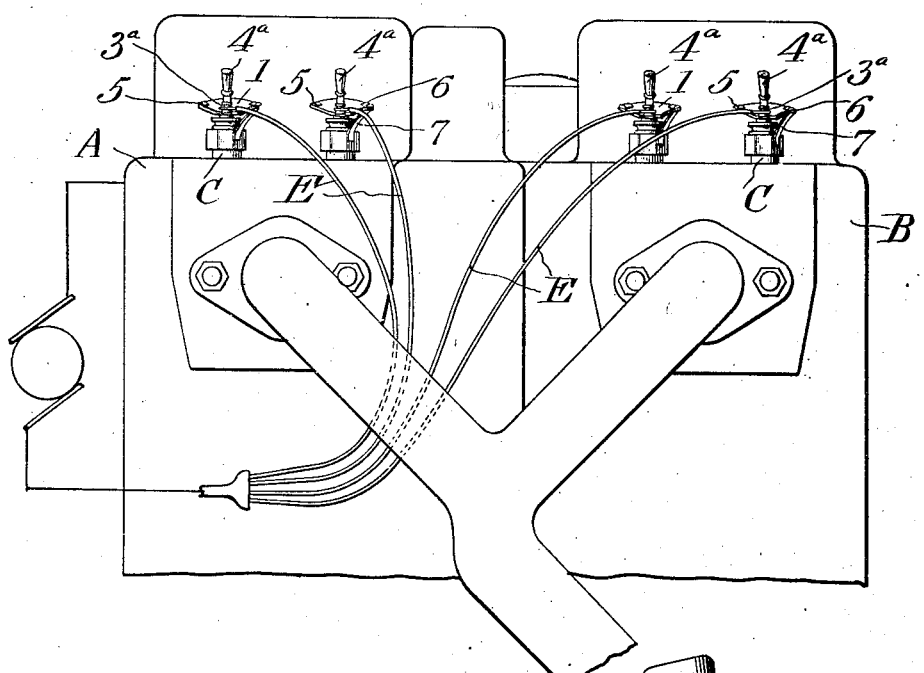
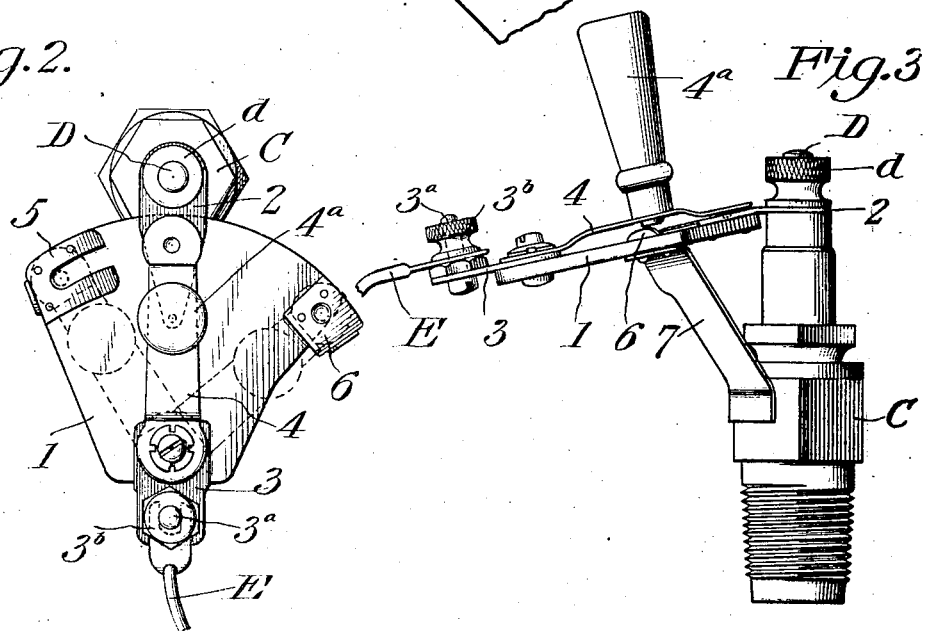
WITNESSES
INVENTOR
Emanuel Yoss
by Alexander Dowell
Attorneys

UNITED STATES PATENT OFFICE.

EMANUEL YOSS, OF SOUTH RICHMOND, VIRGINIA.

TESTING DEVICE FOR ELECTRICAL IGNITION APPARATUS FOR EXPLOSIVE-ENGINES.

1,095,486.  Specification of Letters Patent.  Patented May 5, 1914.

Application filed July 20, 1912. Serial No. 710,592.

*To all whom it may concern:*

Be it known that I, EMANUEL YOSS, of South Richmond, in the county of Henrico and State of Virginia, have invented certain new and useful Improvements in Testing Devices for Electrical Ignition Apparatus for Explosive-Engines; and I hereby declare that the following is a full, clear, and exact description thereof, reference being had to the accompanying drawings, which form part of this specification.

This invention is a novel device for testing the operative condition of high tension electrical ignition apparatus on internal combustion engines and for locating the position of a "dead" cylinder in a battery of such cylinders such as are commonly used in explosive or internal combustion engines.

The main object of the invention is to provide a switch for each spark plug of such engines, such switch being connected in series with the high tension circuit, and preferably mounted upon the spark plug, but it may be mounted at any suitable place, for the purpose of testing the operating condition of the ignition apparatus. The said switch can be shifted for the purpose of producing an air gap across which the high tension current can be seen jumping before entering the spark plug core terminal, thereby making the high tension current visible without interrupting the ignition of gas in the cylinder. The switch is further provided with a grounding contact that may be connected with the shell of the spark plug, or any other metal part of the engine, and the said grounding contact may be thrown into the circuit for the purpose of short circuiting that spark plug, thereby stopping firing of that cylinder.

By the use of my invention, it can be readily determined by visual test which cylinder of the engine is not working properly; or cylinders missing fire, or what spark plug is carbonized, or core is broken.

The invention is so simple that when an engine is equipped therewith it will enable any one to readily locate the trouble in the ignition system; and it is especially useful when applied to automobiles and enables the chauffeur to place and maintain the engine in proper operative condition with the least trouble and expense.

I will explain the invention in detail with reference to the accompanying drawings in which—

Figure 1 is a view of part of a multiple cylinder explosive engine, each cylinder thereof being equipped with electrical ignition devices and with my novel testing device. Fig. 2 is an enlarged plan view of one of the testing devices showing the switch adjusted in different positions by means of dotted lines. Fig. 3 is a side view of Fig. 2.

In the drawings A and B represent two of the cylinders of an ordinary type of explosive engine, and equipped with the usual gas supply and exhaust valves and connections (not shown) and with electrical ignition devices or "spark plugs." C, all of which may be of the usual well known type.

The core terminal D of each spark plug is ordinarily connected by means of a suitable conductor to a magneto, or other suitable source of high tension electric current; and the other terminal of the spark plug is usually indirectly electrically connected to the other terminal of the magneto through the metal of the spark plug and engine frame or in any other suitable way.

All the aforesaid parts are, or may be, of any preferred construction and being well known need no detailed description.

My invention is an attachment for use in connection with each such spark plug or ignition device; and as shown each attachment comprises a support 1 which is approximately triangular or segment shaped and formed of fiber or other insulating material; and to one edge of this support is attached a strip 2, which may be of brass or other suitable metal, that is preferably perforated at its outer end so that it can be slipped onto the core terminal D of the spark plug and may be secured to such terminal and make an electrical contact therewith by means of an ordinary nut $d$. The plate 2 is preferably connected to the core terminal D in place of the usual electrical conductor. At the side of the support 1 opposite plate 2 is attached another plate 3 which may be provided with a binding post $3^a$ and thumb nut $3^b$ to which the conductor E is attached, instead of such conductor being connected directly to the terminal D of the spark plug.

Pivotally connected to the plate 3 is a switch lever 4, which may be made of brass or other suitable material, provided with a handle 4ª; said lever is long enough to bridge the space between the plates 2 and 3, and when the lever is adjusted to contact with plate 2 as shown in full lines in Fig. 2, an electric circuit is formed directly between the magneto and the spark plug, the same as if the conductor E was connected direct to the terminal D.

To the support 1, at one side of but adjacent the plate 2, is secured a contact piece 5 which extends toward but does not contact with the plate 2, and is in such position that the switch 4 may be swung into contact therewith as indicated in dotted lines in Fig. 2. When the switch 4 is swung to this position the high tension current will jump or spark across the gap between the plate 5 (or the lever 4 resting thereon) and the plate 2, and such spark will be visible to the eye and indicates by its presence that the ignition apparatus is working all right. Another contact plate 6 is attached to the edge of the support 1 at the side of plate 2 opposite contact 5. This contact 6 is in electrical connection with a metal finger 7, preferably a spring plate, which when the support is properly adjusted contacts with the metal of the spark plug, or of the engine, so that if lever 4 be adjusted into contact with plate 6 the electric current will be short circuited and the related spark plug C will be cut out of circuit.

I prefer to use a finger plate 7 for convenience of attachment; but this finger could be substituted by any suitable conductor or device which would make an electrical connection between the contact 6 and the metal of the engine or plug, so as to short circuit the sparking plug C when the switch 4 is in contact with plate 6.

Operation. Each cylinder of the engine or each spark plug is provided with a testing switch; and in the normal operative position of parts each switch lever 4 is adjusted to make contact with its related plate 2 so that the electric current passes directly from the conductor E through plate 3 switch 4 and plate 2 to the spark plug. If a cylinder is not firing properly, as will be readily determined by noting the sounds of the exhaust; the operator should reduce the speed of the engine and test each cylinder thereof as follows: first, to determine whether or not the spark plug of any cylinder is operating properly, the lever 4 should be shifted into contact with plate 5; if a spark appears between the contact 5 and the plate 2 it will show that the ignition apparatus is operating properly. If no spark appears then there is something wrong either in the spark plug or in the connection between the plate 4 and the magneto. If the direct connections between the plate 3 and the magneto are found intact, then the defect is in the spark plug, and it should be removed, cleaned and replaced, making the engine ready for operation. As each cylinder is equipped with such detecting device instead of having to guess at the defective spark plug the operator can with my invention quickly locate it, and avoid unnecessary delays and trouble incident to needlessly removing a number of the spark plugs to locate a defective one.

Explosive engines are usually constructed with batteries of from four to six cylinders and the first indication of anything wrong is usually the irregular explosive emissions from the exhaust. When such an engine is equipped with my invention in order to determine which of the cylinders is "dead" or improperly working, the first thing to do is to test (as above) whether the spark plugs are all operating properly, for if any spark plug does not operate properly of course that cylinder would be dead or inefficient. If, after testing each cylinder as above described, it is found that the sparking devices are operating properly, then the switch lever 4 of each switch should be successively adjusted into contact with its plate 6 until it is found that a change is produced in the exhaust. When the switch lever 4 is adjusted to contact with plate 6 the spark plug of the related cylinder is short circuited, and if it was a properly acting cylinder it will make a change in the sound, or puffs, of the exhaust. The cylinders should be tested successively in this way, and if a cylinder is found which when cut out does not alter the sounds of the exhaust, that will be the dead cylinder, and the plug will need cleaning or some other part in the cylinder will need attention. For example in a battery of say four cylinders if the operator notices that one engine is not working properly by reason of an irregular emission from the exhaust, he will not know which of the four cylinders it is: but (assuming for instance that it is the third), if all the electrical connections are found to be O. K. which are tested by successively shifting the switch levers 4 to contact 5 and watching for the spark; then, beginning with the first cylinder throw the switch levers successively to the contacts 6 in order to short circuit the cylinders. When the first cylinder is short circuited there will be an immediate alteration in the emission sounds of the exhaust which will show that cylinder 1 is all right; and the switch lever should be shifted back to contact 2; the second cylinder is then tested in the same manner, and found all right. But when the defective cylinder 3 is short circuited there is no change in the emissions from the exhaust and this shows that it is the defective or improperly operating cylinder. An engine with any number of cylinders equipped with my testing devices can be very quickly tested and the defective plug or cylinder located without danger to the operator and without requiring any expert skill on his part.

While I have shown and described the testing switches as attached direct to sparking plugs, in some cases it might be preferable, on account of the nature of the engine or related parts, to have the switches located somewhat remote from the plugs; in which event it would only be necessary to make the proper electrical connections, by wires or otherwise, between the plate 2 of each switch and its related spark plug core, and to make like connections between each contact 6 and the related spark plug or its cylinder casing.

What I claim is:

1. A testing device for the electrical ignition apparatus of explosive engines, comprising a plate electrically connected with the terminal of the ignition device; a contact connected to a source of electricity; a switch lever electrically connected to the latter contact and normally closing the circuit between said contact and said plate, said lever being adapted to form a spark gap when moved away from the said contact; and a contact electrically connected with the casing of the ignition apparatus and adapted to cut out such apparatus when the switch lever is moved into contact with said latter contact.

2. An electrical testing device for the spark plugs of explosive engines, comprising a support; a plate thereon adapted to be connected with one terminal of the spark plug; a contact thereon adapted to be connected to a source of electricity; a switch lever connected to the contact and normally closing the circuit with the plate, said lever being adapted to form a spark gap when moved away from the plate; and a contact on the support normally connected with the casing of the spark plug and adapted to cut out the plug when the switch is moved into contact therewith.

3. A testing device for the ignition apparatus of explosive engines; comprising an electrical contact adapted to be connected with the terminal of the ignition device; a second contact adapted to be connected to a source of electricity; a switch lever connected to the latter contact and normally closing the circuit with the first mentioned contact; and a third contact at the side of the first contact, the current being adapted to jump from the third contact to the first contact when the switch lever is moved onto the third contact.

4. An electrical testing device for ignition apparatus of explosive engines comprising an electrical contact connected with the terminal of the ignition device; a second contact connected to a source of electricity; a switch lever connected to the latter contact and normally closing the circuit with the first mentioned contact; a third contact adjacent the first contact, the current jumping from the third contact to the first contact when the switch lever is moved onto the third contact; and a fourth contact normally connected with the casing of the cylinder and adapted to cut out the ignition apparatus when the switch is moved into contact therewith.

5. An electrical testing device for spark plugs of explosive engines; comprising an insulating support; a plate connected with the support, and electrically connected with the core terminal of the spark plug; a pair of contacts on opposite sides of said plate; a switch lever pivoted on the support; means for connecting said switch with a source of electrical energy; and connections between one of the side contacts and the casing of the plug or cylinder, all so arranged that when the switch lever is in contact with the central plate the current is delivered direct to the spark plug; when the switch lever is shifted to one side contact the current sparks between said contact and the central plate; and when the lever is shifted to the outer side contact the plug is cut out, substantially as specified.

6. An electrical testing device for spark plugs of explosive engines; comprising an insulating support; a contact plate connected with the support and adapted to be attached to the core terminal of the spark plug; a pair of contacts attached to said support on opposite sides of said plate; a switch lever pivoted on the support; means for connecting the pivot of said switch with a source of electrical energy; a spring finger connected with one side contact and contacting the casing of the plug or cylinder, all so arranged that when the switch lever is in contact with the central plate the current is delivered direct to the spark plug; when the switch lever is shifted to one side contact the current sparks between said contact and the central plate; and when the lever is shifted to the other side contact the plug is cut out of circuit, substantially as specified.

In testimony that I claim the foregoing as my own, I affix my signature in presence of two witnesses.

EMANUEL YOSS.

Witnesses:
F. S. VADEN,
NICKLAUS YOSS.